United States Patent
Salonen et al.

(10) Patent No.: US 7,106,694 B1
(45) Date of Patent: Sep. 12, 2006

(54) METHOD FOR CONTROLLING BEARER PROPERTIES

(75) Inventors: Janne Salonen, Oulu (FI); Mikko Rinne, Helsinki (FI); Harri Honkasalo, Vantaa (FI); Jaakko Rajaniemi, Helsinki (FI); Kalle Ahmavaara, Vantaa (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/831,013

(22) PCT Filed: Nov. 5, 1999

(86) PCT No.: PCT/FI99/00925

§ 371 (c)(1),
(2), (4) Date: Jun. 8, 2001

(87) PCT Pub. No.: WO00/28760

PCT Pub. Date: May 18, 2000

(30) Foreign Application Priority Data

Nov. 6, 1998 (FI) .................................... 982417

(51) Int. Cl.
*H04Q 7/20* (2006.01)
*H04Q 7/38* (2006.01)
(52) U.S. Cl. ................... 370/230; 370/252; 370/328; 455/452.1; 455/453
(58) Field of Classification Search ............... 370/230, 370/252, 310, 328, 338, 431, 466, 469, 261; 455/452.2, 452.1, 453; 714/755
See application file for complete search history.

(56) References Cited

U.S. PATENT DOCUMENTS

| 5,729,532 | A  | * | 3/1998 | Bales et al. .................. 370/261 |
| 6,374,112 | B1 | * | 4/2002 | Widegren et al. ......... 455/452.2 |
| 6,400,695 | B1 | * | 6/2002 | Chuah et al. ................ 370/310 |
| 6,594,238 | B1 | * | 7/2003 | Wallentin et al. ........... 370/252 |
| 6,629,286 | B1 | * | 9/2003 | Berens et al. ................ 714/755 |
| 6,868,257 | B1 | * | 3/2005 | Holma ....................... 455/63.1 |
| 2003/0153313 | A1 | * | 8/2003 | Faerber et al. .............. 455/436 |

FOREIGN PATENT DOCUMENTS

| EP | 0 836 291 A2 | 4/1998 |
| EP | 0 954 187 A1 | 11/1999 |
| EP | 0 981 229 A2 | 2/2000 |
| WO | WO 97/12490 | 4/1997 |
| WO | WO 99/39528 | 8/1999 |
| WO | WO 99/49684 | 9/1999 |
| WO | WO 99/52307 | 10/1999 |

* cited by examiner

*Primary Examiner*—Alpus H. Hsu
(74) *Attorney, Agent, or Firm*—Cohen, Pontani, Lieberman & Pavane (57) ABSTRACT

The invention concerns the control of connections in cellular telecommunication systems. According to the invention, the available radio resources are controlled by allowing only certain conbinations of transport formats to be used by a single user. The inventive method restricts the combinations of bearer bit rates which can be used, without strictly limiting some bearers from using highest bit rates. This inventive approach allows flexible overall control of radio resources, while retaining the possibility of bearers to select between different bit rates.

25 Claims, 5 Drawing Sheets

METHOD FOR CONTROLLING BEARER PROPERTIES

PRIORITY CLAIM

This is a national stage of PCT application No. PCT/FI99/00925, filed on 5 Nov. 1999. Priority is claimed on patent application No. 982417 filed in Finland on 6 Nov. 1998.

TECHNICAL FIELD OF THE INVENTION

The invention concerns the control of connections in cellular telecommunication systems.

BACKGROUND OF THE INVENTION

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (IWU) connecting the cellular network to another telecommunications network. The set of parameters associated with a bearer comprises typically for example data transmission speed, allowed delays, allowed bit error rate (BER), and the minimum and maximum values for these parameters. A bearer may further be a packet transmission bearer or a circuit switched bearer and support for example transparent or non-transparent connections. A bearer can be thought of as a data transmission path having the specified parameters connecting a certain mobile terminal and a certain network element for transmission of payload information. One bearer always connects only one mobile terminal to one network element. However, a bearer can pass through a number of network elements. One mobile communication means (ME, Mobile Equipment) may in some cellular telecommunication systems support one bearer only, in some other systems also more than one simultaneous bearers.

In the new cellular telecommunication systems such as the UMTS system (Universal Mobile Telecommunication System) under development, variable bit rate bearers will be in much more widespread use than in the present systems. Multiple simultaneous bearers with multiple bit rate options will result in high amount of combinations to be supported. It is desirable that also the air interface part of the communications system supports this kind of bearer combinations efficiently, i.e. without excessive use of radio resources. Since the bit rates of bearers may change from frame to frame, the bit rates need to be indicated in the frames. Assuming that all possible combinations of instantaneous bit rates of different bearers shall be supported, the amount of bits required for identification of the transmission rate of a radio frame may become excessive. On the other hand, fixed allocation of radio resources according to the maximum possible total bit rate is not feasible. Maximum bit rates of the bearers may be rarely used and if the resources allocated for a user are dimensioned based on the worst case combination i.e. all bearers using the highest possible bit rate, scarce radio resources will be wasted.

SUMMARY OF THE INVENTION

An object of the invention is to realize a method for controlling the bearers, which allows the control of maximum total bit rate of all bearers of a user, while aiming to avoid as much as possible restrictions of use of the highest data rates by a bearer. A further object of the invention is to realize a method, which reduces the amount of data transmission needed for communicating the bit rates of bearers from a transmitting entity to a receiving entity.

The objects are reached by restricting the allowed bit rate combinations, associating an identifier with each allowed combination, and identifying the instantaneous transmission rate using the identifier associated with the particular combination.

The method according to the invention is characterized by that, which is specified in the characterizing part of the independent method claim. The system for controlling bearers in a cellular telecommunication system according to the invention is characterized by that, which is specified in the characterizing part of the independent claim directed to a system for controlling bearers in a cellular telecommunication system. The dependent claims describe further advantageous embodiments of the invention.

According to the invention, the available radio resources are controlled by allowing only certain combinations of transport formats to be used by a single user. The inventive method restricts the combinations of bearer bit rates which can be used, without strictly limiting some bearers from using highest bit rates. Consequently, depending on the available resources, one bearer may well use its highest data rate, possibly even more bearers than one, although the total resource usage of all bearers of the user may be restricted. This inventive approach allows flexible overall control of radio resources, while retaining the possibility for bearers to select between different bit rates.

BRIEF DESCRIPTION OF THE DRAWINGS

The invention is described in more detail in the following with reference to the accompanying drawings, of which

Same reference numerals are used for similar entities in the figures.

DETAILED DESCRIPTION

In the following discussion, the term bit rate refers to the bit rate after channel coding, i.e. the bit rate actually transmitted over the air interface, and not the payload data bit rate unless otherwise specified.

According to the present invention, transmission of a single mobile communication means is controlled by controlling the allowed bit rate combinations of the bearers of the mobile communication means. The allowed combinations of bearer bit rates are restricted in such a way, which does not refuse the possibility of using the highest bit rates for some bearers.

To aid in the description of the invention, certain terms are defined in the following.

A transport format (TF) is a set of parameters, which correspond to a single way of preparing a payload data stream for transmission over the air interface. The set of parameters indicate for example payload data rate, the error control coding method used, interleaving method used, and other processing methods used in the particular cellular telecommunications network, i.e. describe the physical layer processing applied to the data to be transmitted. Consequently, each TF corresponds to a specific instantaneous bearer bit rate. Further, each bearer has at least one transport format. In the case of a bearer supporting for example multiple bit rates, a bearer can have more than one corresponding TF.

Each transport format has a corresponding transport format identifier (TFID). The TFIDs can be assigned to TFs in many ways, for example in ascending order starting from the lowest bit rate, or according to some other predefined rule.

The combination of transport formats of the active bearers is a Transport Format Combination (TFC). The set of all possible transport format combinations form a Transport Format Combination Set (TFCS). Each TFC has a corresponding transport format combination identifier (TFCI), i.e. each TFCI corresponds to a definite group of transport formats. The TFCI is used to inform the current combination of transport formats to the receiver. The TFCI:s are preferably integer numbers.

A. Determination of Allowed Combinations

The determination about which combinations can be used and which cannot can be made on the basis of many different requirements according to the needs of the particular embodiment of the invention. Some examples of such requirements are given in the following.

A.1. An Example of a Limit: Size of TFCI Word

In order to further reduce the amount of data transmission needed for transmission of transport format information over the air interface to the receiver, the size of the TFCI word can be changed. If the TFCI word has m bits, the maximum number N of combinations that can be represented is $N=2^m$. Consequently, the length of the TFCI word simply limits the number of allowed combinations. The length of the TFCI word can be adjusted to give a suitable compromise between use of transmission resources for transmitting the TFCI word and the variety of transport format combinations available. In an advantageous embodiment of the invention, the length of the TFCI word can be changed during a connection.

A.2. An Example of a Limit: Maximum Bit Rate For the User

In a further advantageous embodiment of the invention, maximum allowed bit rate of a user is used in the determination of allowed transport format combinations. In such an embodiment, the allowed combinations include all transport combinations, whose total bit rate is less than or equal to the maximum bit rate for a user.

In various embodiments of the invention, the maximum bit rate may be user-dependent, some users having a different maximum limit from that of others. This provides one way of priorization of users, for example to provide high-paying users and otherwise prioritized users such as rescue workers a better service than to the rest of users.

A.3. Other Grounds for Combination Decisions

In addition to the previously mentioned limits, other information can be used in making decisions about allowed transport format combinations. This kind of information may for example comprise priorities of the bearers, measured throughputs for each bearer as well as the aggregate throughput for the user in question, current load in the cell and interference levels.

B. Construction of TFCS

The construction of the transport format combination set and the assigning of transport format combination identifiers to the various combinations can be performed in many different ways. Some examples of these ways are presented in the following.

B.1 A First Example

Preferably, a table of the allowed transport format combinations is constructed, whereby the table index can be used as the TFCI. Thereafter, only the table index i.e. the TFCI needs to be communicated between the transmitter and the receiver. However, the invention is not limited to using tables, since other means such as linked lists or other data structures can be used for associating a transport format combination and a TFCI.

B.2 A Second Example

Further, a predefined algorithm or rule can be used to generate the TFCI corresponding to a TFC, whereafter the TFCI found in this way can be used as the index to a table for storing the different allowed combinations. The TFCI of a TFC can be determined for example according to the following algorithm:

1. factor=L(K)
2. TFCI=TFID(K)
3. step through all values of j from K−1 to 1, repeating 3a and 3b:
   3a. TFCI=TFCI+TFID(j)*factor
   3b. factor=factor*L(j)

where factor is a temporary variable used in the algorithm,
L(j) is number of TF:s for bearer j,
TFID(j) is TFID of the TF of bearer j, and
K is the number of active bearers.

This algorithm assumes that TFIDs are assigned to TFs in ascending order starting from the lowest bit rate, the first TFID being zero.

B.3 A Third Example

In a further advantageous embodiment of the invention, the TFCI values are assigned simply by iterating through all combinations of all transport formats of the bearers, checking for each combination whether the combination is allowed or not. If the combination is allowed, the next free TFCI value is assigned to the combination. For example, the allowed combination can be entered into the next free position in a table containing the TFCS, the index of the position then being the assigned TFCI.

B.4 A Fourth Example

In a still further advantageous embodiment of the invention, TFCI values are classified into two categories: active and inactive values. Active values are those values which are in use, and inactive values those that are not in use. In such an embodiment, new services can be taken into use by specifying the corresponding TFCI values to be active. If some transport format combinations are removed from use, the corresponding TFCI values are simply specified to be inactive. Such an embodiment has the advantage, that the timing of the changes in the TFCS and TFCI values is not very critical, since other active TFCI values remain unchanged. It is enough from the viewpoint of timing, that any new TFCI values are not used before the receiver has had enough time to receive the message specifying the new values and to change the TFCS and TFCI configuration. In such an embodiment, the message specifying that a TFCI value is now active may for example comprise also the specification of the TFC corresponding to the TFCI. In further embodiments of the invention, the TFC corresponding to a TFCI specified to be active may be previously known by the receiver, or may be deduced from the TFCI by the receiver according to a predefined rule. For example, all possible combinations of transport formats of the bearers can be stored in a table whose index values correspond to the TFCI values, and only those TFCI values are used, which are specified to be active.

B.5 A Fifth Example

In a further advantageous embodiment, the transport format combinations and the corresponding TFCI values are ordered according to the total bit rate of the TFC or some other desired criteria. In such an embodiment, the allowed transport format combinations are indicated simply by indicating the highest allowed TFCI. In such an embodiment, when a new TFC is allowed, the new TFC is inserted in the corresponding location in the ordered sequence of transport format combinations and given the TFCI value corresponding to that position in the sequence. The TFCI values are updated accordingly, i.e. the higher TFCI values are incremented by one. In a similar way, when a TFC is removed from use, it is removed from the ordered sequence, and the TFCI values are updated accordingly.

Preferably, the TFCI of the TFC with lowest bit rate is 0, the TFCI of the TFC with the next lowest bit rate is 1, and so on. However, this numbering scheme is not the only possible method that can be used in various embodiments according to the section B.5 of this specification. Preferably, the TFCI values form a sequence of consecutive integer numbers.

The ordering of transport format combinations and the corresponding TFCI values may take into account also other parameters than the total bit rate of a TFC. For example, if more than one transport format combination has the same total bit rate, these combinations can be ordered according to their relative priority.

In this embodiment, a mobile station can request more resources simply by indicating a new desired highest allowed TFCI in the resource request, to which the network can reply by allocating more resources if possible, and returning a possibly new highest allowed TFCI limit.

C. Changing of the Set of Allowed Transport Formats

The transport format combination set (TFCS) needs to be known both to transmitter and receiver. Each time new variable rate bearer requires establishment of a connection or an old connection is released the TFCS is changed. Further, it may be desirable to restrict the use of certain combinations for some other reasons. To ensure that the transport format combination sets in the transmitter and in the receiver correspond to each other, the set or any changes to the set may need to be signalled from the transmitter to the receiver. Some ways to signal the TFCS according to various advantageous embodiments of the invention are described in the following.

C.1 Signalling of TFCS by Explicit Recitation

In an advantageous embodiment of the invention, the TFCS is signalled from a first end of a connection to a second end of the connection by explicitly reciting all allowed combinations. This embodiment is advantageous, if the number of allowed combinations is relatively small compared to the total number of combinations. In this embodiment, the first end sends one or more messages to the second end, which messages specify at least all allowed combinations, and for each combination specify one TFID at least for each bearer having more than one transport format.

In a further advantageous embodiment of the invention, the TFCS is signalled from a first end of a connection to a second end of the connection by explicitly reciting all those combinations, which are not allowed. This embodiment is advantageous, if the number of non-allowed combinations is smaller than the number of allowed combinations. In this embodiment, the first end sends one or more messages to the second end, which messages specify at least all non-allowed combinations, and for each combination specify one TFID at least for each bearer having more than one transport format.

In a further advantageous embodiment of the invention, the message or messages specifying the allowed or non-allowed combinations, also specify whether the recited combinations are allowed or not. This allows the use of the same message type for specifying allowed and non-allowed combinations.

C.2 Signalling of the TFCS by Indicating Construction Limits

In another advantageous embodiment of the invention, the end of the connection deciding about the allowed combinations informs the other end of the connection only about which limits and other information are to be used in construction of the TFCS. Such a limit may be for example the maximum total bit rate of a single user, and such other information may be for example the priorities of the bearers. Thereafter, the other end constructs the TFCS independently following the specified limits. Since the same limits are used at both ends, the resulting TFCS will be the same. The construction of the TFCS may proceed for example by going through all possible transport format combinations, and checking for each one whether the combination is allowed or not.

C.3 Signalling of the TFCS by Indicating Specific Transport Formats

If the restriction of the combinations is to be done in such a way that some transport formats of some bearers are not used in any of the allowed combinations, the TFCS can be specified with bearer specific messages restricting the use of one or more transport formats of a specific bearer.

In a further advantageous embodiment of the invention, the TFCS is specified with bearer specific messages indicating, which transport formats can be used.

C.4 Further Methods

The previous methods have given examples of methods, in which the TFCS is constructed from scratch by indicating allowed or non-allowed transport formats or combinations of transport formats. However, a new TFCS may also be defined by specifying the changes in the allowed transport format combinations and transport formats relative to the previous TFCS. The messages may specify whether the item being specified is to be allowed or restricted. The item being specified in a message may be for example a TFC, a bearer, or a single transport format of a bearer. For example, the new TFCS may be specified by a message, which restricts the use of one or more transport formats of a specific bearer.

After specifying the changes in the allowed combinations, transport formats and/or bearers, the TFCS is preferably reconstructed so that the TFCS contains only allowed combinations, and the TFCI values updated to correspond to the new TFCS.

The previously described ways of specifying the TFCS to a receiver are examples only and do not limit the invention in any way. Many other ways of specifying a set of combinations or for example different combinations of the previously described ways can as well be used in various embodiments of the invention.

D. Time of Validity

In the previous examples of specifying the TFCS, the message or messages carrying the specifying information of TFCS may also comprise an indication of the starting time, after which the new TFCS is valid. However, the starting time of validity may also be defined implicitly, e.g. the new TFCS may be valid from the time the specifying message arrives or in the case of more than one message being used to specify the TFCS, from the receiving time of the last of these messages.

E. Examples of Admission Control Methods According to the Invention

The cellular telecommunications network can use for example the previously described TFCS construction limits at least partly as the admission condition in an admission control method. For example, the system can determine how many TFCI bits would be required to represent all combinations in the TFCS based on the size of the TFCS and the transport formats of all the bearers. If the amount of TFCI bits is less than equal to a maximum TFCI word length, the network can then refuse the bearer request, or for example in the case of a high priority request, refuse the service from other already established bearers. As another example, the maximum bit rate limit may be considered. In such an example, the bearer is advantageously admitted, if at least some of its transport formats result in an allowed combination. Consequently, a multi-bit-rate bearer may be only partially admitted, i.e. admitted with a restricted selection of bit rates.

If the requested bearer has higher priority than some other bearers, the cellular network preferably allocates resources for the higher priority bearer first and restricts the bit rates of the other bearers to such values, that the resulting TF combination is an allowed combination. This may result in the adjustment of transport format for a bearer having a lower priority, or even refusing the service for a bearer having a lower priority.

Each bearer requiring establishment of a connection preferably indicates the variability of the user bit rate in a predefined way, e.g. using a predefined signalling procedure. The network then determines transport formats for the requested bearer and updates the TFCS accordingly, if the network can provide service for the bearer or for at least some of its transport formats.

Figure 1:
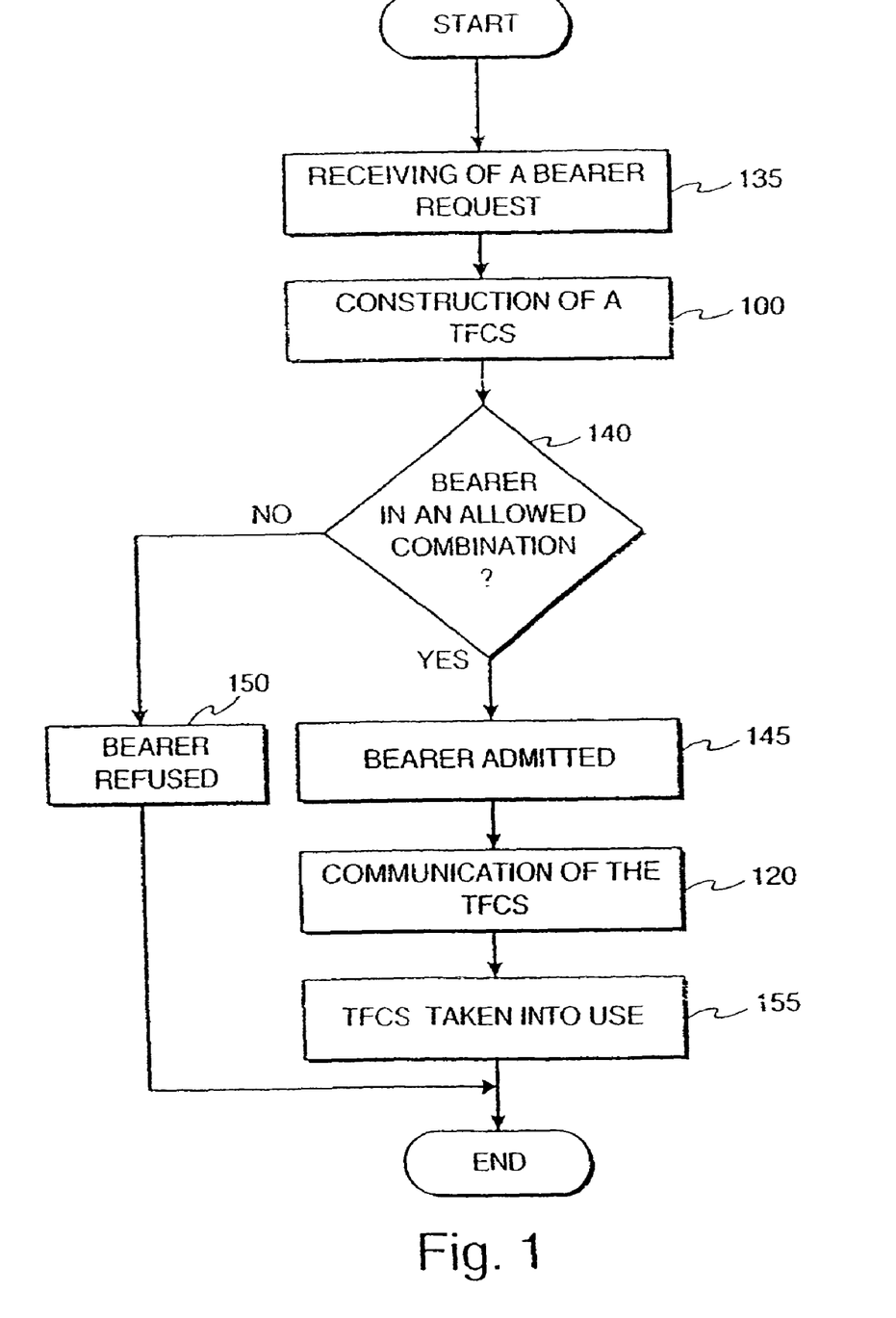
FIG. 1 is a flow chart illustrating the steps of a method for controlling bearer properties in accordance with an embodiment of the invention.

FIG. 1 shows the flow diagram of an advantageous embodiment of the invention. FIG. 1 illustrates one example of the use of the inventive method in admission control. In step 135, a bearer request is received. As a response to the request, a TFCS is constructed in step 100. The step 100 of construction of a TFCS may also take into account the priority of the requested bearer as described previously. After the TFCS is constructed, it is checked in the following step 140 if the bearer belongs to any allowed combination. If the bearer is not a part of any allowed combination, the bearer is refused at step 150, after which the method is ended without taking the newly constructed TFCS into use. If the bearer is found to be a part of at least one TFC, the bearer is admitted in step 145. At the next step 120, the new TFCS is communicated to the receiver, after which the communicated TFCS is taken into use at step 155, after which the method is ended.

In further advantageous embodiments of the invention, the admission requirement may be different from the example of step 140 of FIG. 1. For example, the bearer may be allowed only, if at least one transport format of the bearer is allowed in all combinations. Further, the bearer may also be allowed, if at least one transport format of the bearer is allowed in at least a predefined part of all combinations. In a further advantageous embodiment of the invention, a real time bearer is allowed only, if the highest transport format of the bearer is allowed in at least one TFC.

F. An Example of a Method

In the following, an example of a method according to an advantageous embodiment of the invention is presented. The method is described with reference to FIGS. 2*a* and 2*b* which illustrate as a flow diagram the construction 100 of a transport format combination set and the communication 120 of information to the receiver for construction of the same set at the receiver.

Figure 2A:
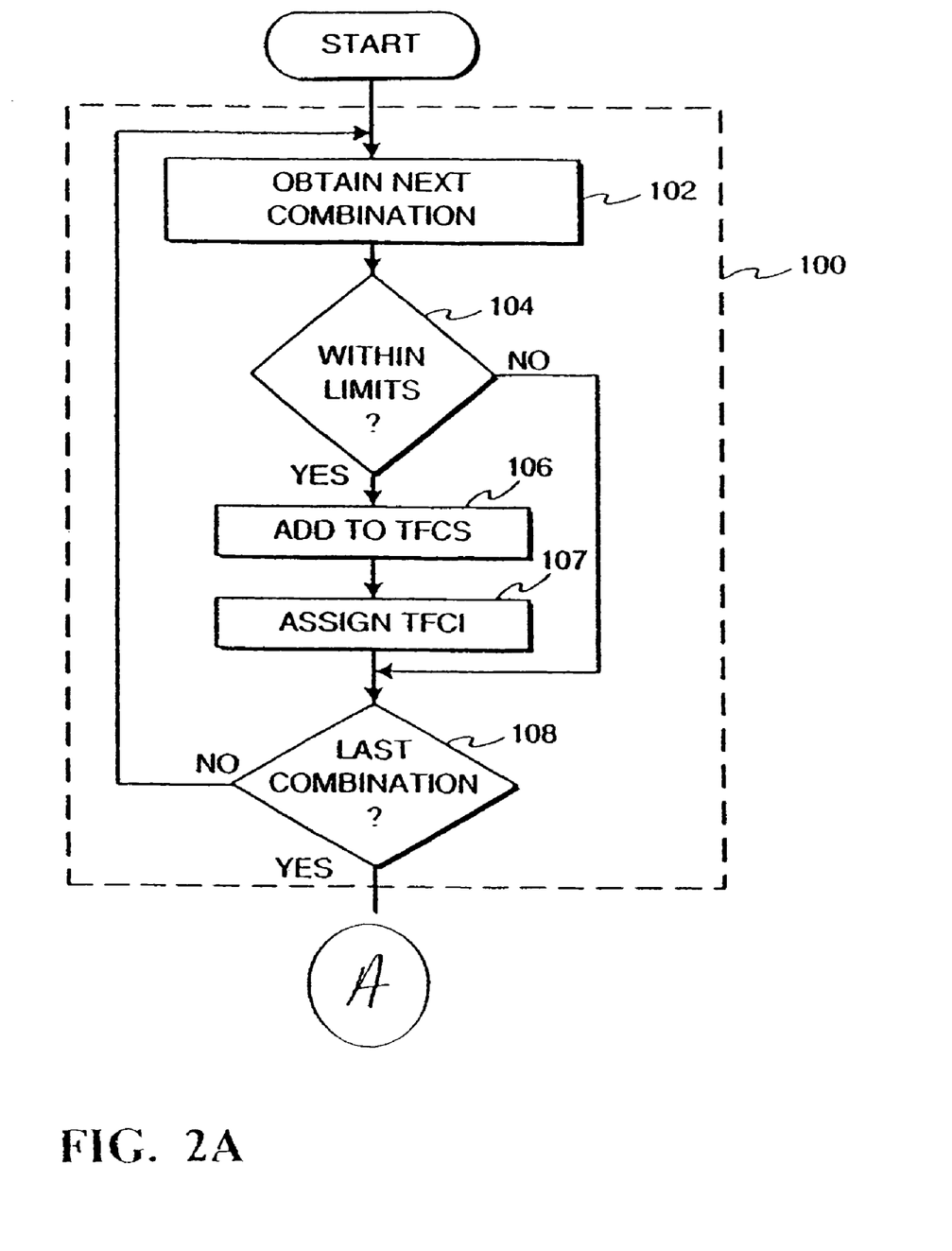
FIGS. 2a and 2b is a flow charting illustrating the steps of a method for controlling bearing properties in accordance with another embodiment of the invention.

In this example, the step of construction 100 of a TFCS comprises the following steps 102, 104, 106, 107, and 108. All combinations are examined one by one, starting with step 102, in which the next, or at the first time after start of the method, the first combination is taken into consideration. In step 104 it is checked, whether the combination is within the predefined limits, such as within a predefined maximum total bit rate limit. If the combination is within the limits, the combination is added to the TFCS at step 106, and a TFCI is assigned to the combination in step 107. If the combination is not within the limits, the method is continued directly at step 108. In either case, in step 108 it is checked if the combination is the last one to be considered. If the combination is not the last one, it is returned back to step 102. If the combination is the last one, the method is continued at step 120.

Figure 2B:
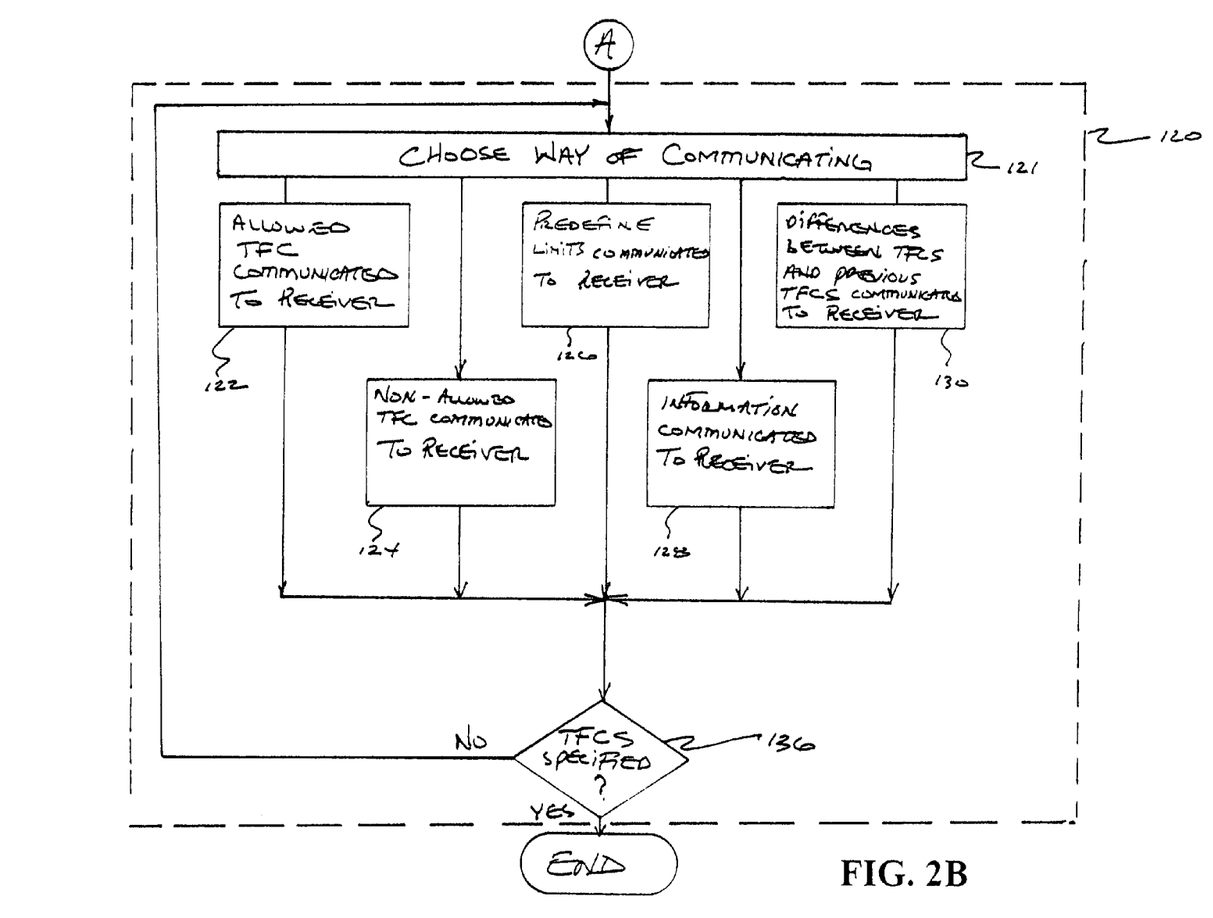

In this example, the step of communication 120 of information to the receiver for construction of the set at the receiver comprises the following steps 121, 122, 124, 126, 128, 130, and 136. At step 121, the way of communicating the TFCS to the receiver is chosen. In this example, the steps 122, 124, 126, 128, 130, and 136 represent different ways of communicating the TFCS. At step 122, each allowed transport format combination is communicated to the receiver. At step 124, each non-allowed transport format combination is communicated to the receiver. At step 126, predefined limits for construction of the TFCS are communicated to the receiver. At step 128, information specifying at least one transport format of at least one bearer, which at least one transport format of at least one bearer is not a part of any allowed transport format combination is communicated to the receiver. At step 130, differences between the TFCS being communicated and a previous TFCS are communicated to the receiver.

The steps 122, 124, 126, 128, and 130 may comprise communication of all necessary information at one method step, or communication of only part of all necessary information. Therefore, at step 136 it is checked if the whole TFCS has been specified. If the whole TFCS has not been specified, it is returned back to step 121 for continuing the communication of the TFCS to the receiver. If the whole TFCS has been specified, the method is ended.

In the step 107 of assigning a TFCI to a combination, the assignment may be performed simply by assigning the next free TFCI value for the combination. Any other method or predefined rule of assigning TFCI values can be used, for example any of those described in the previous section B in this specification.

G. An Example of a System

Figure 3:
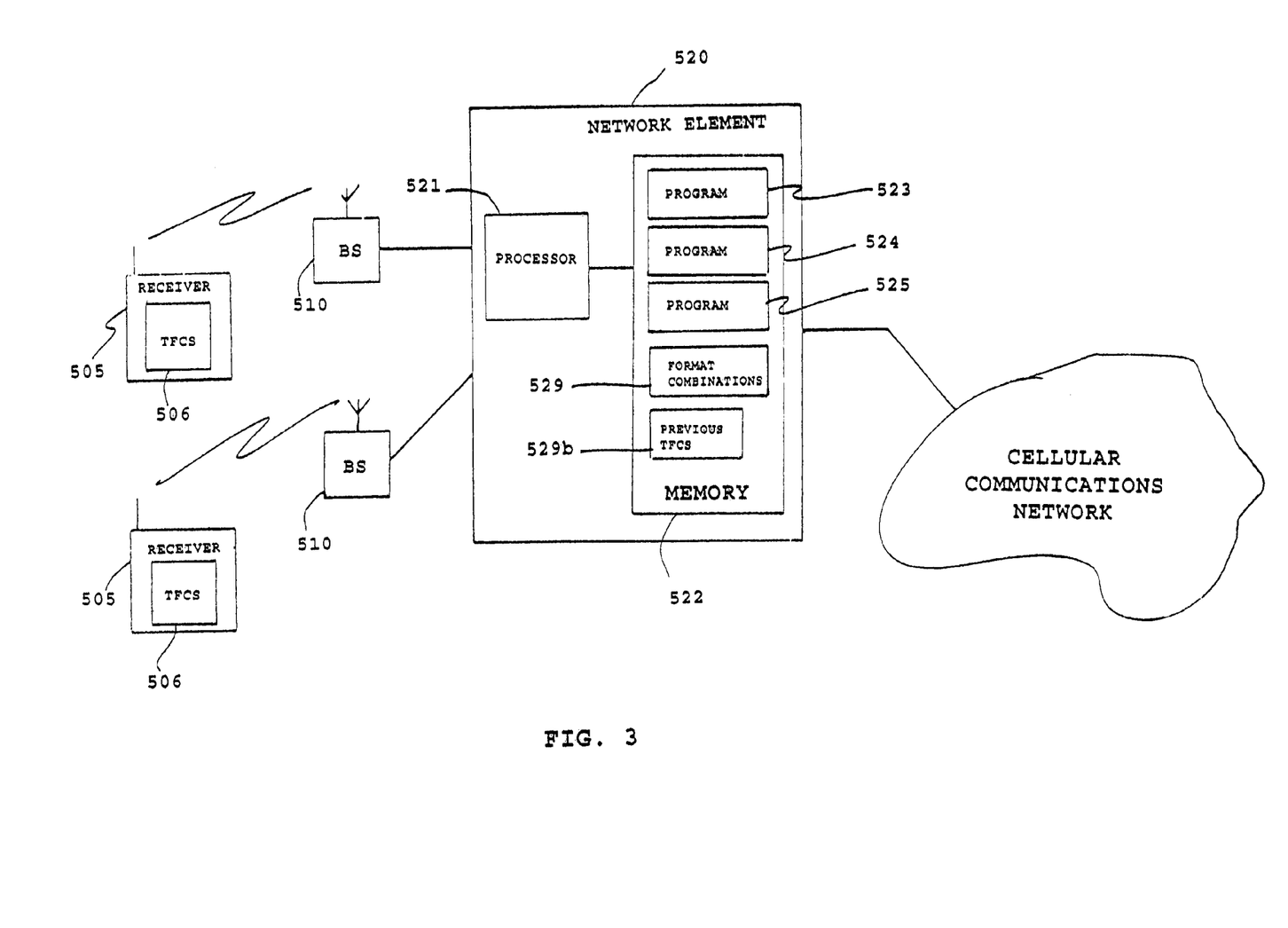
FIG. 3, is an illustration of a schematic block diagram of a system in accordance with an embodiment of the invention.

FIG. 3 illustrates an example of a system according to an advantageous embodiment of the invention. FIG. 3 shows mobile communication means 505, base stations 510, a network element 520 and the rest of a cellular telecommunications network 550. The network element 520 may be for example a radio network controller (RNC) of the UMTS cellular telecommunications network. The network element further comprises a processing unit 521 such as a microprocessor and a memory element 522 for storing programs for the processing unit and one or more transport format combination sets.

Further, according to this example the system comprises means 521 for construction of a set of allowed transport format combinations in a network element of the cellular telecommunication system, and means 521, 510 for communication of a constructed set of allowed transport format combinations to a mobile communication means 505.

During construction of a TFCS, the processor unit 521 performs the previously described checking whether a single transport format combination is within the predetermined limits. The processor unit 521 can perform this task by executing a program 523 stored in the memory means 522, which program directs the processor unit to perform the task. If a transport format combination is found to be within the limits, the processor unit 521 adds the combination to the set of allowed transport format combinations 529 stored in the memory means 522. Preferably, the processor unit also assigns a transport format combination identifier (TFCI) to each transport format combination. The transport format combination identifiers can also be stored in the memory means 522.

The processor unit 521 can also take care of the communication of the constructed TFCS to the receiver, in this case the mobile communication means 505 with the help of other components of the cellular telecommunications network such as base stations 510. The previously described method steps, such as for example determining non-allowed transport format combinations or searching the differences between a transport format combination set and said previously stored second set of allowed transport format combinations can be realized using a program 524 stored in the memory means 522, which program directs the processing unit 521 to perform the method step. Further, the system may store more than one TFCS in the memory means, such as a previously constructed TFCS 529b, which can be used for example in determining the differences between a newly created TFCS and a previously created and communicated TFCS, after which a new TFCS can be communicated to the receiver simply by communicating the differences between the old and new TFCS. The receivers 505 store the communicated TFCS 506 in a memory means in the receiver, whereafter they are able to determine the current transport format combination on the basis of a received TFCI.

Preferably, the system also comprises means for assigning a transport format combination identifier to each transport format combination stored in said memory element. These means may comprise for example the processing unit 521, which can assign TFCI values to transport format combinations for example according to any of the embodiments of the invention described previously.

Preferably, the system also comprises means for sending a transport format combination identifier for identifying the transport formats used in a transmission. These means may comprise for example the processing unit 521, which can add the TFCI of the currently used TFC into the data transmitted to a receiver.

In an advantageous embodiment of the invnetion, also a mobile communication means 505 can comprise the means 521, 522, 523, 524, 525, 529, and 529b, or other means providing similar functionality. Although conventionally it is the network which decides about radio resource usage, the mobile communication means preferably has the capability and functionality needed for construction of a TFCS for example, according to the embodiments of the invention described in section C.2 in this specification, or according to other rules and limits set by the network.

H. A Further Example of a Method

Figure 4:
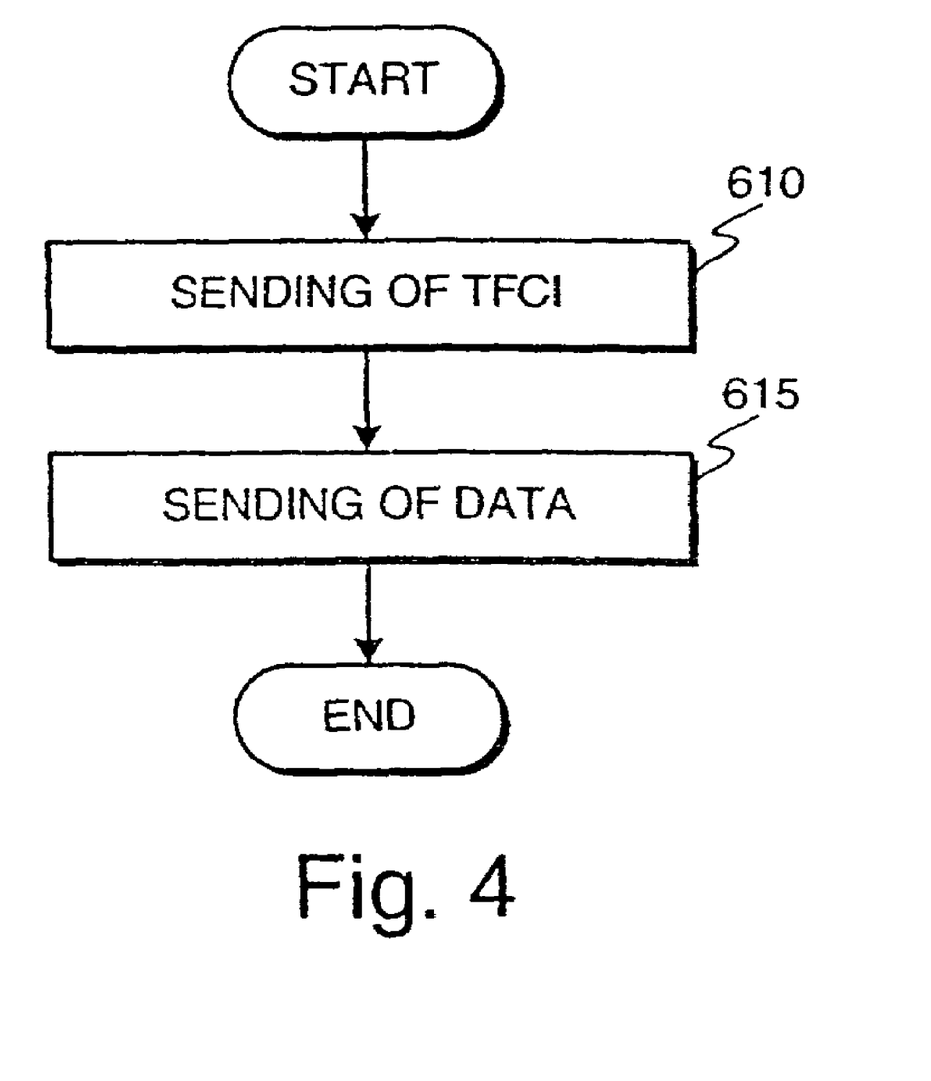
FIG. 4 is a flow chart illustrating the steps of a method for controlling bearer properties in accordance with an additional embodiment of the invention.

The TFCI values can be used to indicate, which transport formats are used in a transmission. For example, a TFCI value can be transmitted in each transmission frame to describe the transmission format or transmission formats used in the frame. In another exemplary embodiment, a TFCI value can be transmitted each time, when the transport format combination is changed. FIG. 4 illustrates one example of signalling according to an advantageous embodiment of the invention. FIG. 4 illustrates events during communication between a transmitting party and a receiving party, such as, respectively, a mobile communication means and a base station of a cellular telecommunications network. First, a TFCI is sent from the transmitter to the receiver in step 610 for indicating, which transport formats are used in the next unit of transmission. In the next step 615, data is transmitted from the transmitter to the receiver, using the transport formats specified by the TFCI value transmitted in the previous step. In various embodiments of the invention, the order of sending of the TFCI value and the data which the TFCI value refers to, does not necessarily need to be that shown in FIG. 4. For example, in such systems in which data is transmitted in frames, such as in the GSM system, the TFCI value can be sent in the same transmission frame as the data which the TFCI value refers to, in which case the exact order of the data and the TFCI value is not important and can be set according to the requirements of the particular application.

I. Further Considerations

In some advantageous embodiments of the invention, the TFCS used for transmission by a party and the TFCS used for reception by the same party do not need to be the same. This is advantageous for example when the amount of radio resources reserved for uplink communication is different from the amount of radio resources reserved for downlink communication. Such a situation is possible for example in the HSCSD (High Speed Circuit Switched Data) mode in GSM networks. Such an arrangement is advantageous for example in data terminal use when browsing information databases or the Internet, where only short requests are transmitted from the mobile communication means, but large amounts of information are returned from the data networks. In such embodiments of the invention, a communicating party preferably has at least two transport format control sets, one of which is used for reception and one for transmission.

In a further advantageous embodiment of the invention, multiple transport format combination sets are used to further reduce transport format signalling between a receiver and a transmitter. In such an embodiment, a plurality of transport format combination sets is constructed and communicated to the receiver, after which the current TFCS to be used is selected simply by sending a TFCS identifier to the receiver. Such an embodiment reduces signalling over the air interface in such a case, in which some transport format combination sets are used relatively often. The plurality of transport format combination sets preferably comprises such sets, which are constructed as a result of most common bearer sets and limits, such as the maximum total bit rate for a user.

In such a case, when the allowed transport format combinations are limited by certain limits, which allow straightforward determination of allowability for a TFC, and the TFCI values are constructed according to a certain rule, explicit construction of a TFCS is not necessary for both parties of the connection. For example, the transmitting party may simply check if a new TFC is allowable according to the limits, and if the TFC is allowed, use the TFC in transmission, generating the TFCI on the fly. The receiving party can then use the TFCI as an index to a table containing the TFCS or, if the transport formats can be deduced from the specified TFCI using an inverse of the rule used for generating the TFCI, determine the used transport formats directly from the TFCI. Therefore, the existence of an explicit TFCS is not necessary in all embodiments of the invention.

In some circumstances, as a result of some kind of an error situation, it may be possible that the receiver and the transmitter have assigned the same TFCI to different transport format combinations. If such an error situation occurs, data transmission does not succeed, since the receiver attempts to interpret the received data stream in a different way than the data stream was constructed. Recovery from such an error situation can proceed in many ways in various embodiments of the invention. For example, according to one advantageous embodiment of the invention, the party which detects the error, informs the other end about the error, whereafter both ends reconstruct their TFCI values for example according to some of the previously described examples, such as those described in sections B.2 or B.3, after which the meaning TFCI values should be the same at both ends. According to another embodiment, the party detecting the error communicates its TFCS and TFCI values to the other party, which takes the communicated values into use. According to a third embodiment, if a mobile communication means detects the error, it requests the network to send the TFCS and the TFCI values used by the network and if the network detects the error, it sends the TFCS and the TFCI values used by the network preferably without waiting for the mobile communication means to request for the information.

In various examples of embodiments described in this specification, the transport formats have been classified as allowed or non-allowed. However, in some embodiments of the invention, a bearer having no allowed transport formats in a TFC can be assigned a null transport format, i.e. a transport format having a zero bit rate. Therefore, a null transport format corresponds to a non-allowed transport format. Therefore, in this specification and the accompanied claims the term allowed transport format refers to a non-null transport format, i.e. a transport format with an essentially nonzero bit rate, which can be used in the TFCS.

The present invention reduces the use of radio resources, while retaining flexibility in the use of different transport formats. The present invention allows restriction of the use of radio resources without making it impossible for some bearers to use high data rates. The flexibility of the inventive method allows such overall control of radio resources, while providing a way to specifically restrict certain specific services as well.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for controlling a plurality of bearers in a cellular telecommunication system, said bearers being data transmission paths relating to a receiver and each bearer having at least one transport format (TF) describing properties of said bearer, the method comprising the steps of:

constructing a set of allowed transport format combinations (TFCS), a transport format combination (TFC) being a combination of transport formats (TF) of a plurality of bearers, and communicating information specifying said set of allowed transport format combinations (TFCS) toward the receiver for construction of said set of allowed transport format combinations (TFCS) at the receiver.

2. The method of claim 1, wherein said set of allowed transport format combinations is constructed by checking for each transport format combination to determine whether the combination is within predefined limits.

3. The method of claim 1, wherein a transport format combination identifier is assigned to each combination of said set of allowed transport format combinations.

4. The method of claim 3, wherein said assigning of transport format combination identifiers is performed in accordance with a predefined rule.

5. The method of claim 4, wherein said set of allowed transport format combinations is ordered according to at least the total bit rate of the transport format combinations, and said transport format combination identifiers are assigned so that the identifiers form a sequence of consecutive integer numbers.

6. The method of claim 1, wherein said step of communicating information for construction of said set comprises the step of communicating each allowed transport format combination to said receiver.

7. The method of claim 1, wherein said step of communicating information for construction of said set comprises the step of communicating each non-allowed transport format combination to said receiver.

8. The method of claim 1, wherein said step of communicating information for construction of said set comprises the step of communicating at least one limit for construction of said set to said receiver.

9. The method of claim 1, wherein said step of communicating information for construction of said set comprises the step of communicating information specifying at least one transport format of at least one bearer, wherein at least one transport format of at least one bearer is not a part of any allowed transport format combination.

10. The method of claim 1, wherein said step of communicating information for construction of said set comprises the step of specifying differences between said set to a previous set of transport format combinations.

11. The method of claim 1, wherein a bearer request is admitted, if at least one of the transport formats of a requested bearer is a part of an allowed transport format combination.

12. The method of claim 3, wherein transport formats used in a transmission between a receiver and a transmitter are identified by sending a transport format combination identifier from the transmitter to the receiver.

13. The method of claim 3, wherein if either party of a connection detects that transport format combination identifiers of the receiver do not correspond to the transport format combination identifiers of the transmitter, the transport format combination identifiers are reconstructed at at least one party of the connection.

14. The method of claim 13, wherein said reconstruction comprises reconstructing transport format combination identifiers at both parties of the connection in accordance with a predefined rule.

15. The method of claim 14, wherein during said reconstructing, one of the parties of the connection communicates its transport format combination identifiers to the other party, which utilizes the communicated identifiers.

16. A system for controlling a plurality of bearers in a cellular telecommunication system, said bearers being data transmission paths relating to a mobile communication means and each bearer having at least one transport format (TF) describing properties of said bearer, the system comprising:
　　means for constructing a set of allowed transport format combinations (TFCS), a transport format combination (TFC) being a combination of transport formats (TF) of a plurality of bearers, in a network element of the cellular telecommunication system, and
　　means for communicating information specifying said set of allowed transport format combinations (TFCS) toward the mobile communication means for constructing said set of allowed transport format combinations (TFCS) at the mobile communication means.

17. The system of claim 16, wherein said means for construction of a set of allowed transport format combinations comprises:
　　a memory element for storing the set of allowed transport format combinations,
　　a means for checking whether a single transport format combination is within predetermined limits, and
　　a means for adding a single transport format combination to said set of allowed transport format combinations stored in said memory element.

18. The system of claim 16, wherein said means for communication of the constructed set of allowed transport format combinations to the mobile communication means comprises means for determining non-allowed transport format combinations.

19. The system of claim 16, further comprising means for storing a previously constructed second set of allowed transport format combinations, wherein said means for communication of a constructed set of allowed transport format combinations to a mobile communication means comprises means for searching differences between a transport format combination set and a stored second set of allowed transport format combinations.

20. The system of claim 16, further comprising means for assigning a transport format combination identifier to each transport format combination stored in a memory element.

21. The system of claim 16, further comprising means for sending a transport format combination identifier for identifying the transport formats used in a transmission.

22. A mobile communication device for controlling a plurality of bearers in a cellular telecommunication system, said bearers being data transmission paths relating to a mobile communication means and each bearer having at least one transport format (TF) describing properties of said bearer, the system comprising:
　　means for constructing a set of allowed transport format combinations (TFCS), a transport format combination (TFC) being a combination of transport formats (TF) of a plurality of bearers, in the mobile communication means of the cellular telecommunication system, and
　　means for communicating information specifying said set of allowed transport format combinations (TFCS) toward a network element for constructing said set of allowed transport format combinations (TFCS) at the network element.

23. A mobile communication device for controlling a plurality of bearers in a cellular telecommunication system, said bearers being data transmission paths relating to a mobile communication means and each bearer having at least one transport format (TF) describing properties of said bearer, the system comprising:
　　means for constructing a set of allowed transport format combinations (TFCS), a transport format combination (TFC) being a combination of transport formats (TF) of a plurality of bearers and having a transport format combination identifier (TFCI), in the mobile communication means of the cellular telecommunication system,
　　means for communicating information specifying said set of allowed transport format combinations (TFCS) to a network element for constructing said set of allowed transport format combinations (TFCS) at the network element, and
　　means for communicating a current TFC belonging to said set of allowed transport format combinations to the network element via information indicative of a corresponding transport format combination identifier.

24. A method for controlling a plurality of bearers in a cellular telecommunication system, said bearers being data transmission paths relating to a receiver and each bearer having at least one transport format (TF) describing properties of said bearer, the method comprising the steps of:
　　constructing a set of allowed transport format combinations (TFCS), a transport format combination (TFC) being a combination of transport formats (TF) of a plurality of bearers and having a transport format combination identifier (TFCI),
　　communicating information specifying said set of allowed transport format combinations (TFCS) to the receiver for construction of said set of allowed transport format combinations (TFCS) at the receiver, and
　　communicating a current TFC belonging to said set of allowed transport format combinations to the receiver via information indicative of a corresponding transport format combination identifier.

25. A system for controlling a plurality of bearers in a cellular telecommunication system, said bearers being data transmission paths relating to a mobile communication means and each bearer having at least one transport format (TF) describing properties of said bearer, the system comprising:
　　means for constructing a set of allowed transport format combinations (TFCS), a transport format combination (TFC) being a combination of transport formats (TF) of a plurality of bearers and having a transport format combination identifier (TFCI), in a network element of the cellular telecommunication system,
　　means for communicating information specifying said set of allowed transport format combinations (TFCS) to the mobile communication means for constructing said set of allowed transport format combinations (TFCS) at the mobile communication means, and
　　means for communicating a current TFC belonging to said set of allowed transport format combinations to the mobile communication means via information indicative of a corresponding transport format combination identifier.

* * * * *